(12) United States Patent
Antipa et al.

(10) Patent No.: US 11,063,956 B2
(45) Date of Patent: Jul. 13, 2021

(54) PROTECTING DOCUMENTS FROM CROSS-SITE SCRIPTING ATTACKS

(71) Applicant: ADOBE INC., San Jose, CA (US)

(72) Inventors: Damien Antipa, Saint-Louis (FR); Antonio Sanso, Allschwil (CH)

(73) Assignee: ADOBE INC., San Jose, CA (US)

( * ) Notice: Subject to any disclaimer, the term of this patent is extended or adjusted under 35 U.S.C. 154(b) by 1011 days.

(21) Appl. No.: 14/541,785

(22) Filed: Nov. 14, 2014

(65) Prior Publication Data

US 2016/0142419 A1   May 19, 2016

(51) Int. Cl.
*H04L 29/06* (2006.01)
*G06F 21/53* (2013.01)

(52) U.S. Cl.
CPC ............ *H04L 63/105* (2013.01); *G06F 21/53* (2013.01); *H04L 63/1466* (2013.01)

(58) Field of Classification Search
CPC .... G06F 21/53; H04L 63/105; H04L 63/1466
See application file for complete search history.

(56) References Cited

U.S. PATENT DOCUMENTS

| | | | | |
|---|---|---|---|---|
| 9,201,850 | B1* | 12/2015 | Buddhiraja | G06F 17/21 |
| 2006/0010134 | A1* | 1/2006 | Davis | H04L 63/168 |
| | | | | 707/999.01 |
| 2006/0021029 | A1* | 1/2006 | Brickell | G06F 21/51 |
| | | | | 726/22 |
| 2007/0300064 | A1* | 12/2007 | Isaacs | G06F 17/30899 |
| | | | | 713/168 |
| 2008/0222736 | A1* | 9/2008 | Boodaei | G06F 21/128 |
| | | | | 726/27 |
| 2011/0185427 | A1* | 7/2011 | Aciicmez | G06F 21/53 |
| | | | | 726/24 |
| 2011/0289556 | A1* | 11/2011 | Pieczul | G06F 21/53 |
| | | | | 726/3 |

OTHER PUBLICATIONS

Louw, Mike "Blueprint: Robust Prevention of Cross-site Scripting Attacks for Existing Browsers" 2009 IEEE (Year: 2009).*

* cited by examiner

*Primary Examiner* — Stephen S Hong
*Assistant Examiner* — Nicholas Hasty
(74) *Attorney, Agent, or Firm* — Shook, Hardy & Bacon L.L.P.

(57) ABSTRACT

In various implementations, an embedded document receives untrusted content from a containing document, where the embedded document is in the containing document. In some cases, the untrusted content is received by the containing document from a server and is forwarded to the embedded document without rendering the untrusted content in the containing document. Instead, the untrusted content is rendered in the embedded document. A sandbox policy is enforced on the embedded document such that the rendered untrusted content is restricted from accessing data associated with the containing document. The untrusted content may comprise malicious code that when rendered executes an XXS attack that attempts to access the data associated with the containing document. However, because the untrusted content is rendered in the embedded document, the malicious code may be denied access to the data, thereby preventing the XSS attack from succeeding.

20 Claims, 6 Drawing Sheets

PROTECTING DOCUMENTS FROM CROSS-SITE SCRIPTING ATTACKS

BACKGROUND

Cross-Site Scripting (XSS) is a computer security vulnerability typically found in web applications. XSS allows malicious users, or attackers, to inject code into web pages that are loaded by other users. In some cases, the injected code can allow an attacker to access sensitive data, such as private user data. For example, the attacker may gain access to a user's login credentials, which may be stored as a hash value in a cookie. With such private data, the attacker may perform illicit actions by being authenticated using the user's login credentials or otherwise appropriating the user's private user data. Such attacks may be especially troublesome where the user whose private data was compromised is an administrator or superuser.

XSS vulnerabilities have been exploited and reported since the 1990s. Various approaches have been employed to protect against XSS attacks. In some cases, developers may turn to web document authoring tools, such as Adobe® Experience Manager, to assist in authoring web sites that are more resilient to XSS attacks. However, year after year, XSS continues to be ranked as one of the most prevalent computer security vulnerabilities. It has therefore become apparent that XSS vulnerabilities are likely to exist even where substantial measures are taken to protect against XSS attacks.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

In accordance with aspects of the present disclosure, untrusted content, which may or may not include malicious code capable of an XSS attack, is received by a containing document (e.g. a web page), such as a HyperText Markup Language (HTML) document. The containing document forwards the untrusted content to an embedded document, which can be in an inline frame (iframe) of the containing document, without rendering the untrusted content in the containing document. The untrusted content may instead be rendered in the embedded document. A sandbox policy is enforced such that even if the rendered untrusted content comprises malicious code, the rendered untrusted content is unable to access sensitive data associated with the containing document. As such, the rendered untrusted content may be unable to access cookies, local storage (e.g. HTML local storage), or other repositories that may include sensitive data.

In addition to untrusted content, in some implementations, the containing document may optionally provide trusted content to the embedded document, which is rendered in the embedded document. Furthermore, the embedded document may be initially provided and/or loaded with content. The content provided by the containing document, and/or the initial content (e.g. from a server) may comprise one or more forms, stylings, and/or or other elements that may be rendered in the embedded document. One or more forms in the embedded document may be utilized to receive new untrusted content, and/or modifications to the untrusted content that was received from the containing document, or other content of the embedded document. The new and/or modified content may be sent by the embedded document to the containing document. The containing document may forward the content to a server without rendering the content. Thus, the sensitive data is further protected from any malicious code that could be included in the new and/or modified content.

BRIEF DESCRIPTION OF THE DRAWINGS

The present invention is described in detail below with reference to the attached drawing figures, wherein.

DETAILED DESCRIPTION

Figure 1:
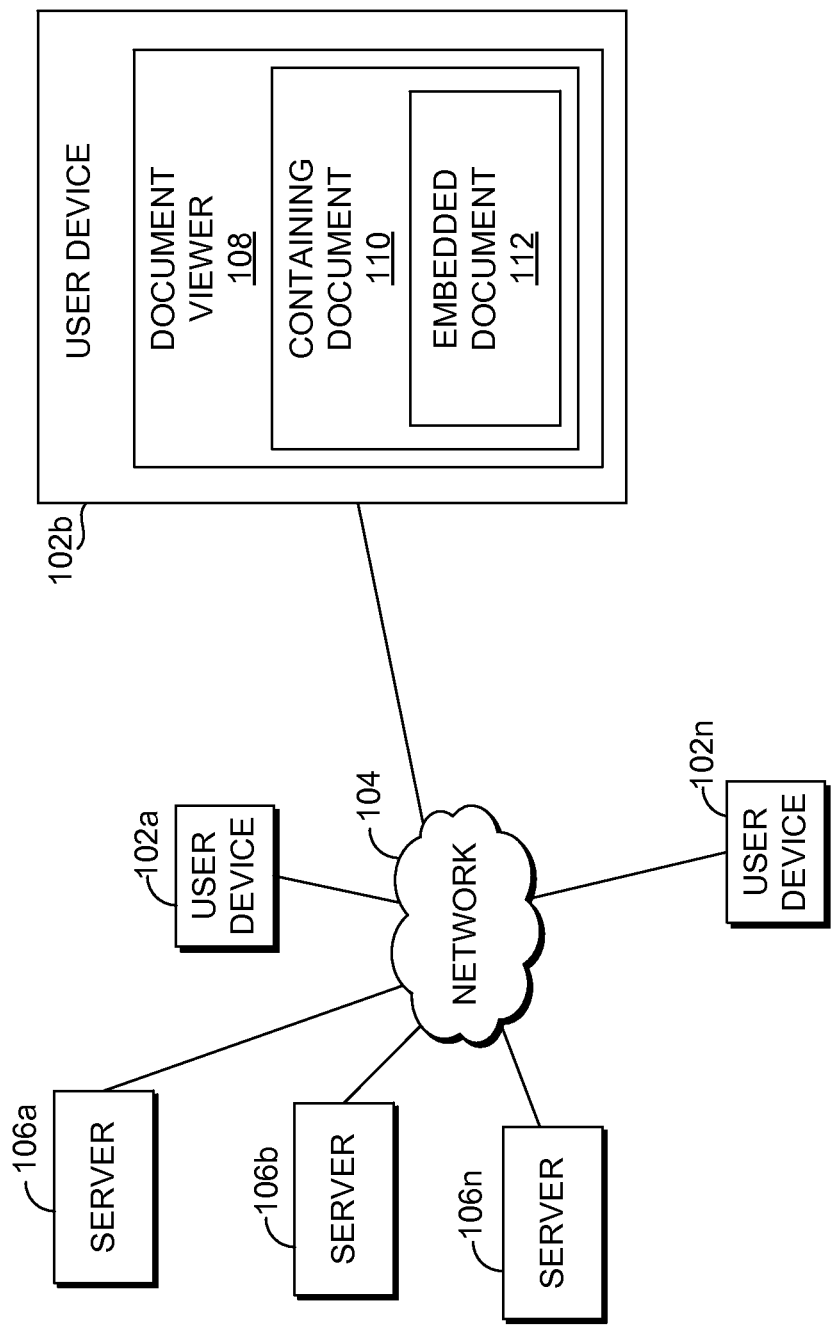
FIG. 1 is a block diagram showing an exemplary system for protecting documents from cross-site scripting attacks in accordance with implementations of the present disclosure.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Various terms are used throughout this description. Definitions of some terms are included below to provide a clearer understanding of the ideas disclosed herein:

The term "containing document" refers to a document that includes one or more other documents embedded therein.

An "embedded document" refers to a document that is embedded in a containing document. In some cases, a document may be both an embedded document and a containing document, where another document is embedded in the document.

A "sandbox policy" refers to a policy that restricts how a document can interact with a resource of another document. The sandbox policy can be enforced by a document viewer used to view the documents. An example, of a sandbox policy is a same-origin policy that restricts how a document or script loaded from one origin can interact with a resource from another origin. Typically, documents subject to a sandbox policy, such as those loaded from different origins, are isolated from each other in terms of access to each other's resources.

A "document authoring tool" refers to software that one or more authors can utilize to construct a document, such as a web document. Among other things, a document authoring tool may be used by an author to add components to a document. The components can each include blocks of preconfigured content (e.g. markup, JavaScript, and/or other code), which may optionally be modified and/or supplemented by the author.

The term "trusted content" or "trusted data" refers to content data from a trusted source.

The term "untrusted content" or "untrusted data" refers to content data from an untrusted source that can include an XSS attack payload. Examples include immediate user input, data received from a server that may have been provided to the server by a malicious user, as well as values obtained from a history token read from a uniform resource locater (URL) fragment.

"Sensitive data" refers to data comprising information protected against unwarranted disclosure. Examples of sensitive data include private data, personal data, confidential data, classified data, financial data, federally protected data, state protected data, user passwords, answer's to security questions, social security numbers, and more.

Cross-Site Scripting (XSS) is a computer security vulnerability typically found in web applications. XSS allows malicious users, or attackers, to inject code into web pages that are loaded by other users. In some cases, the injected code is malicious code that attempts to provide the attacker with access to sensitive data, such as private user data. The injected code can be included in untrusted content provided to the web pages. Although various approaches have been employed to protect against XSS attacks, XSS continues to be ranked as one of the most prevalent computer security vulnerabilities.

Aspects of the present disclosure relate to protecting documents from XSS attacks. In certain respects, an embedded document is included in a containing document. In some cases, the embedded document may be in an inline frame (iframe) of the containing document, which can be a markup language document, such as a HyperText Markup Language (HTML) document. The containing document includes a content handler that can receive untrusted content and optionally trusted content, and can forward at least some of the content to the embedded document. The embedded document also includes a content handler, which can receive the content sent by the content handler of the containing document. A content processor of the embedded document can process at least some of the received content and can be used to render untrusted content, and optionally trusted content, received from the containing document.

In further respects, the containing document can forward the untrusted content to the embedded document without rendering the untrusted content. Furthermore, a sandbox policy, such as a same-origin policy, can restrict the embedded document from accessing one or more resources of the containing document. As such, even if the untrusted content includes malicious code that attempts an XSS attack, the containing document is protected, as the rendered untrusted content is unable to access sensitive data associated with the containing document. In some cases, the sandbox policy is established by providing the embedded document in a different domain as the containing document. However, in some implementations, even where the embedded document is in the same domain, the sandbox policy can be enforced. For example, a sandbox policy may be established by treating the embedded document as having a different origin than the containing document.

In some cases, one or more forms in the embedded document may be utilized to receive new untrusted content, and/or modifications to the untrusted content that was received from the containing document, or other content of the embedded document (e.g. content from a server). The forms may be rendered from trusted and/or untrusted content received by the embedded document, and/or from content initially provided and/or loaded on the embedded document. The new and/or modified content may be processed by the content processor of the embedded document and sent by the content handler of the embedded document. The content handler of the containing document may receive the content and forward the content to a server without rendering the content. Thus, sensitive data associated with the containing document is further protected from malicious code that could be included in the new and/or modified content.

Turning now to FIG. 1, a diagram is provided illustrating an exemplary system 100 in which some implementations of the present disclosure may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Among other components not shown, system 100 includes any number of user devices, such as user devices 102*a* and 102*b* through 102*n*, network 104, and one or more servers, such as servers 106*a* and 106*b* through 106*n*. It should be understood that any number of servers and user devices may be employed within system 100 within the scope of the present disclosure. Each may comprise a single device or multiple devices cooperating in a distributed environment. Additionally, other components not shown may also be included within the distributed environment.

It should further be understood that system 100 shown in FIG. 1 is an example of one suitable computing system architecture. Each of the servers and user devices shown in FIG. 1 may be implemented via a computing device, such as computing device 500, later described with reference to FIG. 5, for example. The components may communicate with each other via network 104. Network 104 may be wired, wireless, or both. Network 104 may include multiple networks, or a network of networks, but is shown in simple form so as not to obscure aspects of the present disclosure. By way of example, network 104 can include one or more wide area networks (WANs), one or more local area networks (LANs), one or more public networks, such as the Internet, and/or one or more private networks. Where network 104 includes a wireless telecommunications network, components such as a base station, a communications tower, or even access points (as well as other components) may provide wireless connectivity. Networking environments are commonplace in offices, enterprise-wide computer networks, intranets, and the Internet. Accordingly, network 104 is not described in significant detail.

In various implementations, user devices 102*a* and 102*b* through 102*n* are computing devices that are capable of accessing the Internet, such as the World Wide Web. As such, the user devices might take on a variety of forms, such as a personal computer (PC), a laptop computer, a mobile phone, a tablet computer, a wearable computer, a personal digital assistant (PDA), an MP3 player, a global positioning system (GPS) device, a video player, a handheld communications device, a smart phone, a smart watch, a workstation, any combination of these delineated devices, or any other suitable device.

User devices 102a and 102b through 102n can include one or more processors, and one or more computer-readable media. The computer-readable media may include computer-readable instructions executable by the one or more processors. The instructions may correspond to one or more applications, such as document viewer 108, shown on user device 102b. It is noted that document viewer 108 could at least partially be on one or more servers. Additionally, although document viewer 108 is described any suitable application may be employed for implementing aspects of the present disclosure.

Document viewer 108 can comprise a browser, such as a web browser capable of viewing web pages. Document viewer 108 is configured to communicate with one or more servers 106a and 106b through 106n via network 104, which may comprise the Internet. In doing so, document viewer 108 can receive content from one or more servers and can render the content for a user in the form of a document, such as containing document 110 in FIG. 1. Document viewer 108 can further be used to render one or more documents in containing document 110, such as embedded document 112.

In the present implementation, containing document 110 is a markup language document, and more particularly an HTML document. Embedded document 112 is within an iframe of containing document 110. In accordance with implementations of the present disclosure, a sandbox policy is enforced on embedded document 112 that restricts the embedded document from accessing one or more resources of containing document 110.

The sandbox policy can be enforced by document viewer 108 and can isolate containing document 110 and embedded document 112 from each other in terms of access to each other's resources, or at least may prevent embedded document 112 from accessing resources of containing document 110. Thus, for example, embedded document 112 may be unable to access sensitive data associated with containing document 110, which may be included in one or more cookies (e.g. authentication cookies), tokens (e.g. authentication tokens), and local storage (e.g. HTML local storage) of containing document 110. As an example, embedded document 112 may be unable to access a document model object (DOM) of containing document 110.

The sensitive data associated with containing document 110 can comprise private user data. For example, a user on user device 102b may log into a user account via document viewer 108, such that private user data is accessible to containing document 110. The private user data may include an authentication hash for the user account that could be in an authentication cookie. If malicious code were run in document viewer 108 the private user data may be compromised. For example, an XSS attack could be executed to provide an attacker with the private user data. With such private data, the attacker may perform illicit actions by being authenticated using the user's login credentials or otherwise appropriating the user's private user data. However, the sandbox policy can prevent malicious code executed in embedded document 112 from accessing the sensitive data.

In some implementations, the sandbox policy is established by providing embedded document 112 in a different domain as containing document 110. In doing so, document viewer 108 may enforce the sandbox policy on embedded document 112 and containing document 110 as a same-origin policy. However, in some implementations, even where the embedded document is in the same domain, the sandbox policy can be enforced. For example, a sandbox policy may be established by treating the embedded document as having a different origin than the containing document. For example, code (e.g. a selection value) in the containing document may indicate to document viewer 108 that a sandbox policy should be enforced on embedded document 112. As one specific example, HTML5 includes a sandbox attribute that enables a set of extra retractions for the content in an iframe. The sandbox attribute can be used with allow-same-origin disabled, such that iframe content is not treated as being from the same origin as containing document 110. In this way, document viewer 108 may selectively impose a sandbox policy, such as the same-origin policy on embedded document 112 and/or other embedded documents included in containing document 110.

While the sandbox policy can protect containing document 110 from malicious code in embedded document 112, malicious code running on containing document 110 could still have access to sensitive data of containing document 110. For example, untrusted content received by containing document 110 could include malicious code capable of executing an XSS attack if run on containing document 110. In accordance with implementations of the present disclosure, untrusted content received by containing document 110 not run on containing document 110. Instead, the untrusted content may be forwarded to embedded document 112 without rendering the untrusted content on containing document 110. The untrusted content may be rendered on embedded document 112 and subject to the sandbox policy.

In some implementations, embedded document 112, and optionally other embedded documents in containing document 110 that are subject to a sandbox policy, are displayed in document viewer 108 without a visual indication that the embedded document is a separate document from containing document 110. In this way, the untrusted content may be rendered to appear as being rendered on containing document 110, while actually being rendered on the embedded document. Thus, containing document 110 may be protected from XSS attacks in a manner that is visually unnoticeable to the user.

Figure 2A:
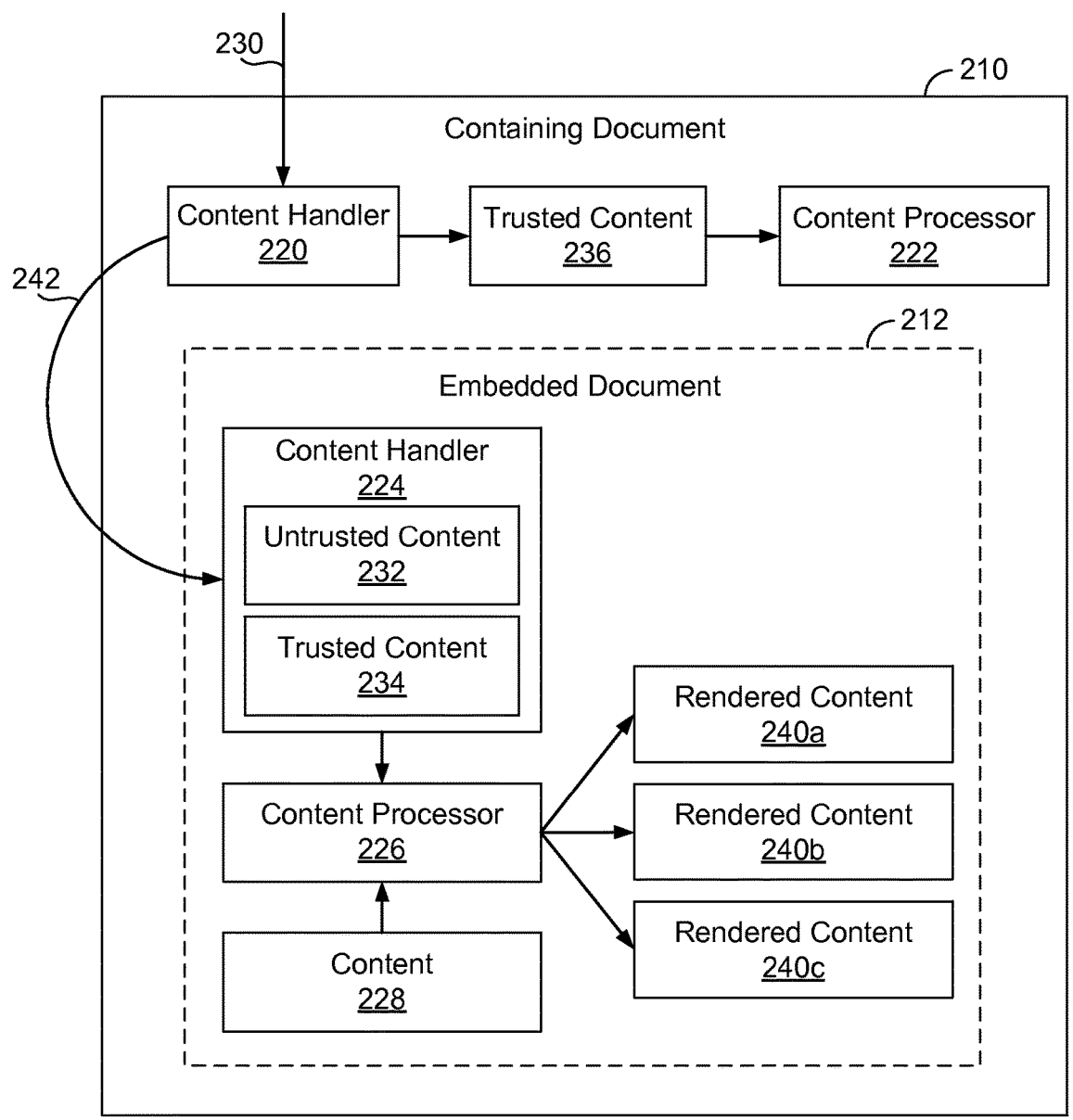
FIG. 2A is illustrates exemplary containing and embedded documents in accordance with implementations of the present disclosure.

Referring now to FIG. 2A, FIG. 2A illustrates exemplary containing and embedded documents in accordance with implementations of the present disclosure. In particular, containing document 210 and embedded document 212 correspond respectively to containing document 110 and embedded document 112 in FIG. 1.

In the implementation shown, containing document 210 includes content handler 220 and optionally content processor 222. Embedded document 212 includes content handler 224 and content processor 226. Content handler 220 is configured to receive content from one or more content inputs, such as content input 230. At least some of the content received by content handler 220 can comprise untrusted content. Furthermore, content handler 220 may optionally receive at least some trusted content.

Content received by content handler 220 can be from one or more servers, such as servers 106a and 106b through 106n. As an example, a user could log into a user account, for example, on containing document 110, and can receive at least some of the content from an authenticated communication with a server based on the user's login credentials.

In addition, or instead, content may be received from an unauthenticated communication with the server.

As another option, at least some of the content received by content handler 220 may be from immediate user input. For example, a user could enter the content into containing document 110 during a browsing session. The content may be entered as input via one or more forms on containing document 110, such as an HTML form, or a web form. The forms may be rendered trusted content initially loaded with containing document 110, or from trusted content later received by content handler 220, such as trusted content 236. Content entered into one or more forms on containing document 110 may be provided to a server, such as any of servers 106a and 106b through 106n in an authenticated or unauthenticated manner by content handler 220. Content received in this manner may be untrusted content that is not rendered on containing document 110.

Where trusted content is received by content handler 220, content handler 220 may optionally provide at least some of the trusted content to content processor 222 for processing. An example of such trusted content is trusted content 236, shown in FIG. 2A. Trusted content 236 may be processed by content processor 222 to render trusted content 236 on containing document 210.

Where untrusted content is received by content handler 220, content handler 220 may forward at least some of the untrusted content to embedded document 212. The untrusted content can be forwarded without being rendered on containing document 210. An example of such untrusted content is untrusted content 232 shown in FIG. 2A. At least some trusted content received by content handler 220 may optionally also be forwarded to embedded document 212, and may or may not be rendered on containing document 210. An example of such trusted content is trusted content 234, shown in FIG. 2A.

Content handler 224 can receive content from content handler 220 and can provide the received content to content processor 226, as shown. Content processor 226 can process the content, which can include rendering the content on embedded document 212. Examples of rendered content are shown as rendered content 240a, 240b, and 240c, although more or fewer rendered content may be on embedded document 212.

In some implementations, content handlers 220 and 224 are implemented using respective scripts, which may be JavaScript, or other code in containing document 210 and embedded document 212 that allows containing document 210 and embedded document 212 to communicate with one another. In various implementations, content can be sent from one content handler to the other utilizing one or more messages, such as message 242 in cross-document communication. In some implementations, each message comprises a string that corresponds to the content. In some cases, the string comprises markup (e.g. HTML), JavaScript Object Notation (JSON), and/or other information corresponding to the content. Content processor 226 can extract the code and/or values from the one or more messages to provide the rendered content.

In some implementations, content handlers 220 and 224 can implement messaging using postMessage functions for cross-document communication between containing document 210 and embedded document 212 (e.g. using message events). The postMessage functions may be provided by an HTML application programming interface (API), such as the window.postMessage API. Content handlers 220 and 224 may further comprise one or more event listeners for receiving message events corresponding to the messages. The event listeners may also be provided using an HTML API. Using the event listeners, an event bus may be established between the documents, where the event bus is a one way bus in some implementations, or is a two way bus in other implementations.

In implementations where multiple embedded documents are included in containing document 210, content handler 220 may be capable of communicating with each of the embedded documents, which may optionally be over respective event busses. In some cases, content handler 220 may determine which received content to send to which embedded document. However, at least some of the content may be provided to multiple embedded documents. For example the same trusted content may optionally be provided to and rendered by multiple embedded documents. In some cases, the content processor in an embedded document determines whether or not received content is intended for the embedded document. The content processor may render the content based on the content being intended for the embedded document or may refrain from rendering based on the content not being intended for the embedded document.

Rendered content 240a, 240b, and 240c may be rendered from untrusted and/or trusted content. In being executed, any of the rendered content may attempt an XSS attack. However, due to the sandbox policy, sensitive data in containing document 210 is protected from being accessed in the XSS attack.

Rendered content can generally comprise any content capable of being rendered in an embedded document, such as an iframe. As indicated above, the content may be received by content processor 226 as a string in one or more messages. In some cases, the content (e.g. the string) comprises one or more values, which can be provided as input to code that generates the rendered content. At least some of the code could optionally be provided by the same one or more messages as the string. In addition, or instead, at least some of the code could be provided by one or more different messages, either as untrusted and/or trusted content. In some cases, at least some of the code corresponds to content that was initially provided by a server in loading embedded document 112, or could otherwise be from a source other than containing document 210, such as another embedded document, or immediate user input to embedded document 112. Content 228 is an example of such content.

As indicated above, in addition to, or instead of comprising one or more values, the content (e.g. the string) can include code for the rendered content. The code may comprise markup that is extracted from one or more messages by content processor 226. The code may be at least partially incorporated into rendered content. In some cases, that code may modify rendered content in embedded document 212, content processor 226, and/or content handler 224.

In some cases, the rendered content comprises a script, such as JavaScript, or other malicious code. The malicious code may have been injected into a document (e.g. containing document 210, embedded document 212, or another document) by another user and may have been stored on a server as untrusted content, such as one of servers 106a and 106b through 106n. The untrusted content may have later been received by content handler 220, and subsequently by content handler 224 as untrusted content 232. As another example, the untrusted content may have been from immediate user input to containing document 210.

The malicious code, when executed may attempt an XSS attack. However, due to the sandbox policy, sensitive data in containing document 210 is protected from being accessed in the XSS attack. For example, document viewer 108 may prevent embedded document 212 from accessing cookies, tokens, local storage, and other potential sources of sensitive data accessible to containing document 210, such as the DOM of containing document 210. Utilizing content handlers 220 and 224 controlled communications can be made between containing document 210 and embedded document 212. This can allow containing document 210 to provide embedded document 212 with access to content from containing document 210 without embedded document 212 being able to directly access that content.

Figure 2B:
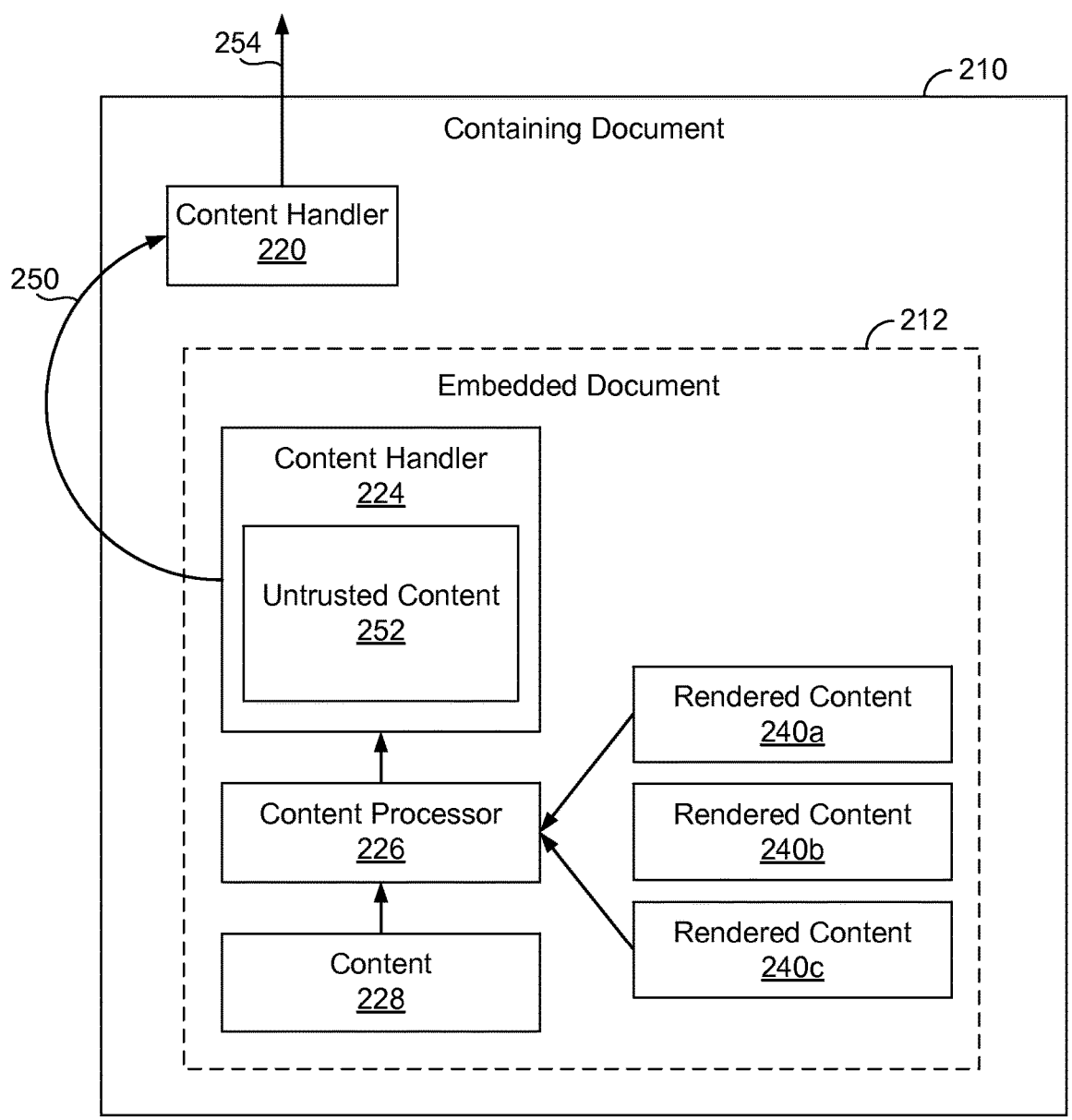
FIG. 2B is illustrates exemplary containing and embedded documents in accordance with implementations of the present disclosure.

FIG. 2A shows message 242 being provided from containing document 210 to embedded document 212. As indicated above, and further described with respect to FIG. 2B, in some implementations, embedded document 212 can optionally provide one or more messages that is received by containing document 210. Referring to FIG. 2B, FIG. 2B illustrates exemplary containing document 210 and embedded document 212 in accordance with implementations of the present disclosure.

An example of the one or more messages is shown as message 250 in FIG. 2B. Message 250 can be used to send content from content handler 224 that is received by content handler 220. The content can be sent by content handler 224 similar to how content is sent by content handler 220, as described above. Thus, a postMessage could be used to send and event message over the event bus. Furthermore, the content can be sent as a string in one or more messages and content handler 220 may comprise an event listener to detect the one or more messages. In some implementations, content processor 226 receives the content to be sent by content handler 224 and serializes the content into one or more strings. Each message sent by content handler 224 may include one of the strings.

The content sent by content handler 224 and received by content handler 220 can be from any of a variety of possible sources. In some cases, the content is received using at least one rendered content, such as rendered content 240a and 240c. For example, rendered content 240a may comprise a form, such as a text box. As another example, rendered content 240c may comprise a text field. Content received from immediate input (e.g. as textual input) of a user into one or both of those forms may be included in untrusted content 252. Unlike rendered content 240a and 240c, rendered content 240b may not comprise a means to obtain user input. For example, rendered content 240b may comprise text and/or other non-executable content displayed in embedded document 212.

At least some of content received by content handler 220 of containing document 210 may be forwarded to a server, such as one or more of servers 106a and 106b through 106n. The content can be forwarded to the same and/or different servers as used to receive content (e.g. over content input 230). Content handler 220 is configured to forward the content from one or more content outputs, such as content output 254. Content received from an embedded document, such as embedded document 212 may correspond to untrusted content. In particular, because rendered content in embedded document 212 could be based on untrusted content, content received from embedded document 212 may comprise malicious code capable of an XSS attack. Thus, in some implementations, content received from embedded document 212 is not rendered in containing document 210. However, that content could later be received from a server by containing document 210, or another instance of containing document 210, and rendered in an embedded document, such as embedded document 212, or another instance of embedded document 212.

Figure 3:
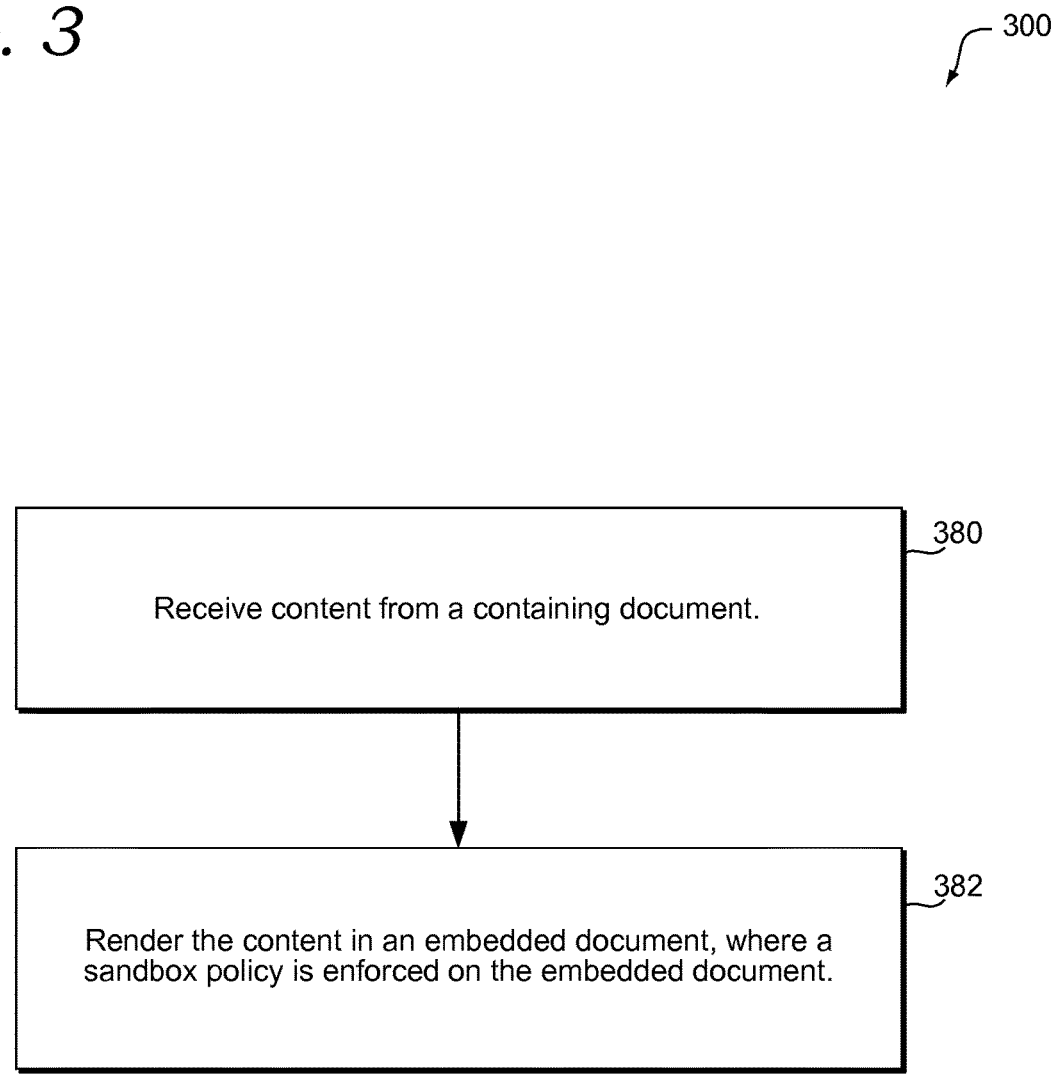
FIG. 3 is a flow diagram showing a method for protecting documents from cross-site scripting attacks in accordance with implementations of the present disclosure.

Referring to FIG. 3 with FIGS. 1, 2A, and 2B, FIG. 3 is a flow diagram showing method 300 for protecting documents from cross-site scripting attacks in accordance with implementations of the present disclosure. Each block of method 300 and other methods described herein comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few.

At block 380, content is received from a containing document. For example, containing document 210 and embedded document 212 may be loaded in document viewer 108, where document viewer 108 is a web browser and embedded document 212 is in an iframe in containing document 210. Containing document 210 may have been initially loaded from server 106a with content handler 220, and optionally content processor 222 and/or other content. Embedded document 212 may have been initially loaded from server 106a with content handler 224, content processor 226, and optionally other content, such as content 228.

Content handler 224 of embedded document 212 may receive untrusted content 232 from content handler 220 of containing document 210 after the documents are initially loaded. Prior to block 380, content handler 220 of containing document 210 may have received untrusted content 232 from content input 230. As one example, content input 230 could correspond to server 106a. A user may have logged into containing document 210. The user's login credentials may be in an authentication cookie, which is used to receive untrusted content 232 in an authenticated communication with server 106a (e.g. asynchronously). Untrusted content 232 could comprise, for example, a post made in a forum that was stored by server 106a. The post comprises JavaScript capable of executing an XSS attack when rendered in a document.

In the present example, content handlers 220 and 224 each comprises JavaScript provided in initially loading their respective documents. Content handler 220 is configured to forward untrusted content received by containing document 210 to embedded document 212, such that the received content is never rendered on containing document 210. Thus, the XSS attack from the code in untrusted content 232 is not executed on containing document 210.

Also in the present example, content handler 220 provides untrusted content 232 to content handler 224 by sending a message comprising a string that corresponds to untrusted content 232. In some cases, the string may have been what was provided to content handler 220 by server 106a in a network communication. Content handler 224 comprises an event listener that receives the message in a message event.

At block 382, the content is rendered in an embedded document, where a sandbox policy is enforced on the embedded document. Continuing with the present example, content processor 226 may comprise JavaScript configured to extract the string corresponding to untrusted content 232 from the message received by content handler 224. The JavaScript may further be configured to render the string, which could be HTML or JSON, for example. As one example, in rendering the string, content processor 226 executes the JavaScript capable of executing the XSS attack. As another example, content processor 226 generates rendered content 240b comprising the text of the post in untrusted content 232, as well as a button that reads "Edit Post." When, a user clicks the button, the JavaScript capable of executing the XSS attack is executed.

The XSS attack attempts to access the authentication cookie of the user. However, document viewer 108 enforces a sandbox policy, such that embedded document 212 is denied access to the authentication cookie. Thus, containing document 210 is protected from the XSS attack. More particularly, in the current example, containing document 210 is in the domain ".adobe.com" and embedded document 212 is in the sub domain ".forums.adobe.com." Thus, document viewer 108 isolates embedded document 212 from accessing resources of containing document 210 based on a same-origin policy. In this way, even when an XSS attack is attempted, sensitive data of containing document 210 is protected.

Figure 4:
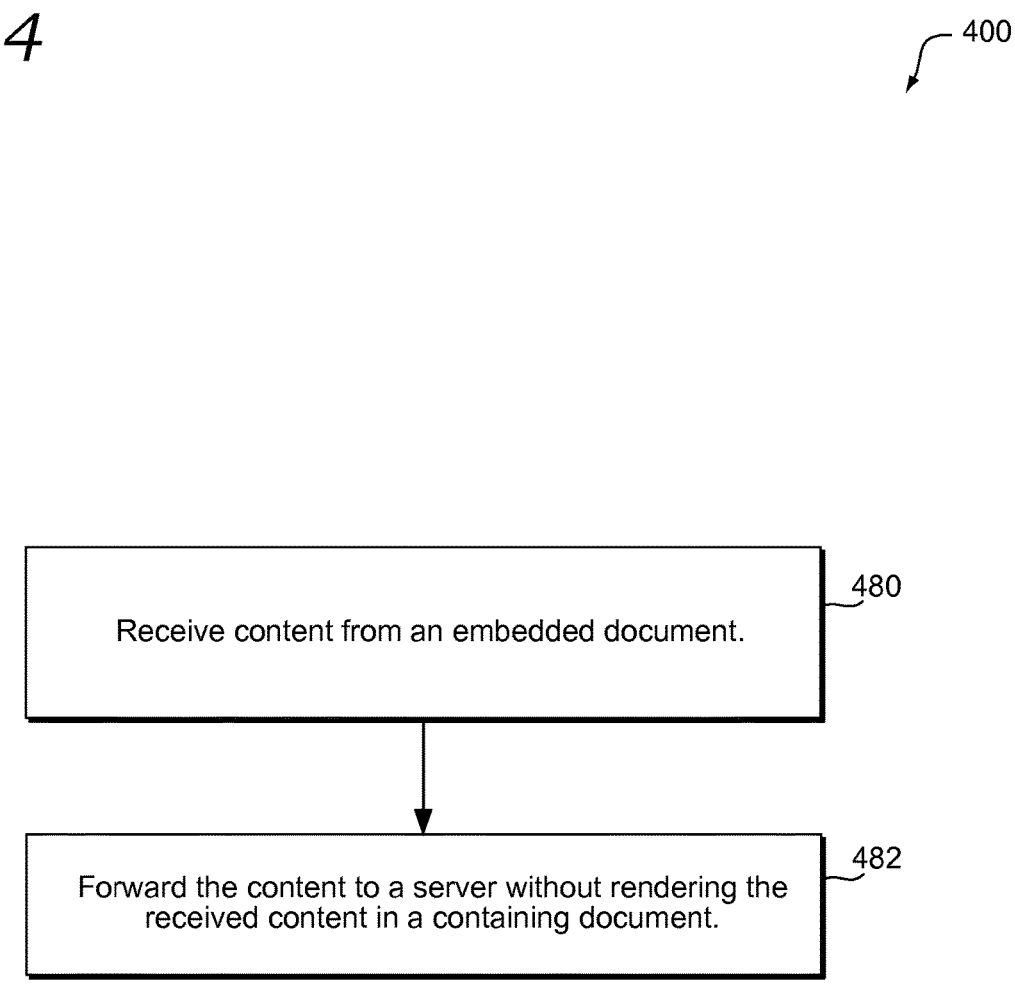
FIG. 4 is a flow diagram showing a method for protecting documents from cross-site scripting attacks in accordance with implementations of the present disclosure.

Referring to FIG. 4 with FIGS. 1, 2A, and 2B, FIG. 4 is a flow diagram showing method 300 for protecting documents from cross-site scripting attacks in accordance with implementations of the present disclosure.

At block 480, content is received from an embedded document. Continuing with the example above, untrusted content may have been rendered as a text box in embedded document 212, and may correspond to rendered content 240c. A user may enter input into the text box and press a submit button, which automatically inserts malicious code into the input that is capable of executing an XSS attack. As an alternative, the user may have inadvertently entered the malicious code as the input. Content processor 226 received the input corresponding to untrusted content 252 and serialized the input into a string. Content handler 224 sent the string in a message, which is received by content handler 220. For example, content handler 220 comprises an event listener that received the message.

Method 400 continues with forwarding the content to a server without rendering the received content in a containing document. For example, content handler 224 can forward untrusted content 252 to server 106a in an authenticated communication (e.g. using the authentication cookie) or an unauthenticated communication. In some cases, the string corresponding to the content may be forwarded to server 106a without processing and/or rendering the string. Although untrusted content 252 comprises the malicious code in the present example, the malicious code is not executed on containing document 210. Thus, containing document 210 is protected from the XSS attack. Furthermore, a method similar to method 300 may be employed in the future when providing untrusted content that includes the malicious code. As such, the malicious code may still be unable to successfully perform the XSS attack.

Figure 5:
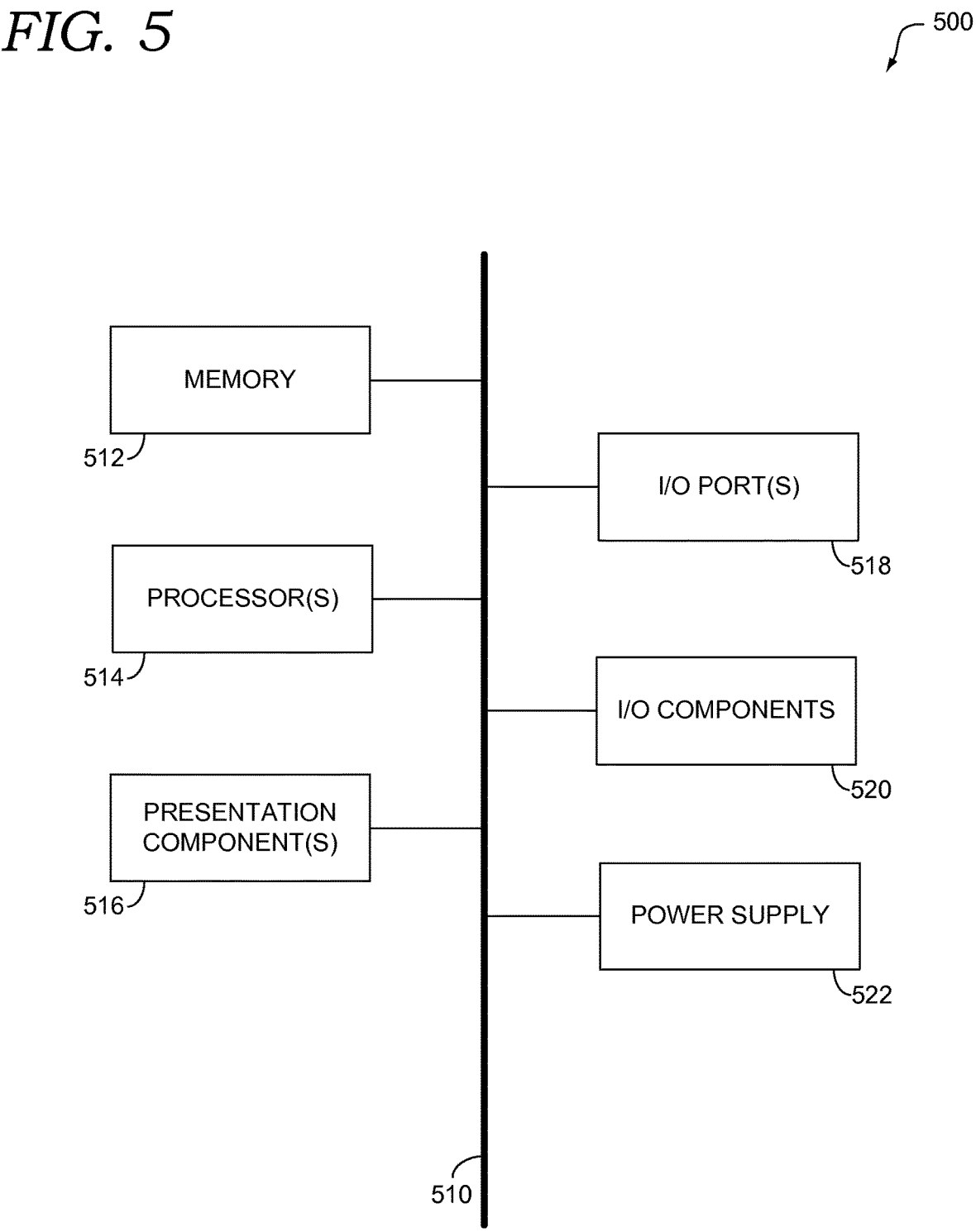
FIG. 5 is a block diagram of an exemplary computing environment suitable for use in implementations of the present disclosure.

Having described implementations of the present disclosure, an exemplary operating environment in which embodiments of the present invention may be implemented is described below in order to provide a general context for various aspects of the present disclosure. Referring initially to FIG. 5 in particular, an exemplary operating environment for implementing embodiments of the present invention is shown and designated generally as computing device 500. Computing device 500 is but one example of a suitable computing environment and is not intended to suggest any limitation as to the scope of use or functionality of the invention. Neither should the computing device 500 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 5, computing device 500 includes bus 510 that directly or indirectly couples the following devices: memory 512, one or more processors 514, one or more presentation components 516, input/output (I/O) ports 518, input/output components 520, and illustrative power supply 522. Bus 510 represents what may be one or more busses (such as an address bus, data bus, or combination thereof). Although the various blocks of FIG. 5 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 5 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 5 and reference to "computing device."

Computing device 500 typically includes a variety of computer-readable media. Computer-readable media can be any available media that can be accessed by computing device 500 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 500. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 512 includes computer-storage media in the form of volatile and/or nonvolatile memory. The memory may be removable, non-removable, or a combination thereof. Exemplary hardware devices include solid-state memory, hard drives, optical-disc drives, etc. Computing device 500 includes one or more processors that read data from various entities such as memory 512 or I/O components 520. Presentation component(s) 516 present data indications to a user or other device. Exemplary presentation components include a display device, speaker, printing component, vibrating component, etc.

I/O ports 518 allow computing device 500 to be logically coupled to other devices including I/O components 520, some of which may be built in. Illustrative components include a microphone, joystick, game pad, satellite dish, scanner, printer, wireless device, etc. The I/O components 520 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye tracking, and touch recognition associated with displays on the computing device 500. The computing device 500 may be equipped with depth cameras, such as, stereoscopic camera systems, infrared camera systems, RGB camera systems, and combinations of these for gesture detection and recognition. Additionally, the computing device 500 may be equipped with accelerometers or gyroscopes that enable detection of motion. The output of the accelerometers or gyroscopes may be provided to the display of the computing device 500 to render immersive augmented reality or virtual reality.

As can be understood, implementations of the present disclosure provide for protecting documents from XSS attacks. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more computer storage media storing computer-useable instructions that, when used by one or more computing devices, cause the one or more computing devices to perform operations comprising:
   receiving, by a first content handler that is part of an embedded document embedded in a containing document, untrusted content sent by a second content handler that is part of the containing document, wherein content in the embedded document is rendered in the containing document displayed in an application and the untrusted content is forwarded to the embedded document by the second content handler without the untrusted content being rendered directly in the containing document;
   rendering the received untrusted content in the embedded document, wherein a sandbox policy of the application is enforced on the embedded document by the application such that the rendered untrusted content is restricted from accessing at least some data associated with the containing document.

2. The one or more computer storage media of claim 1, further comprising:
   receiving, by the first content handler of the embedded document, additional untrusted content from one or more users; and
   sending the received additional untrusted content to the second content handler of the containing document.

3. The one or more computer storage media of claim 1, further comprising the second content handler of the containing document receiving the untrusted content from a server and the second content handler forwarding the received untrusted content to the first content handler for the receiving of the untrusted content by the embedded document.

4. The one or more computer storage media of claim 1, further comprising the second content handler of the containing document receiving the untrusted content from user input to the containing document and the second content handler forwarding the received untrusted content to the first content handler for the receiving of the untrusted content by the embedded document.

5. The one or more computer storage media of claim 1, further comprising the second content handler of the containing document receiving the untrusted content and the second content handler forwarding the received untrusted content to the first content handler for the receiving of the untrusted content by the embedded document.

6. The one or more computer storage media of claim 1, further comprising the application displaying the embedded document without a visual indication that the embedded document is a separate document from the containing document.

7. The one or more computer storage media of claim 1, further comprising the second content handler of the containing document receiving the untrusted content from a server in a user authenticated communication and the second content handler forwarding the received untrusted content to the first content handler for the receiving of the untrusted content by the embedded document.

8. The one or more computer storage media of claim 1, wherein the at least some data comprises an authentication cookie of a user logged into the containing document.

9. The one or more computer storage media of claim 1, wherein the sandbox policy is a same-origin policy.

10. The one or more computer storage media of claim 1, wherein the containing document is a markup language document.

11. The one or more computer storage media of claim 1, wherein the embedded document is in a different domain than the containing document.

12. The one or more computer storage media of claim 1, wherein the embedded document is in a same domain as the containing document.

13. The one or more computer storage media of claim 1, wherein at least some of the data is in the document object model (DOM) of the containing document.

14. A computer implemented method comprising:
   receiving, by a first content handler that is part of an embedded document embedded in a containing document, untrusted content sent by a second content handler that is part of the containing document, wherein content in the embedded document is rendered in the containing document displayed in a document viewer and the untrusted content is forwarded to the embedded document by the second content handler without the untrusted content being rendered in the containing document;

rendering the received untrusted content in the embedded document, wherein the document viewer prevents the rendered untrusted content from accessing at least some data associated with the containing document by enforcing a sandbox policy on the embedded document.

15. The computer implemented method of claim 14, wherein the containing document is a first HyperText Markup Language (HTML) document and the embedded document is a second HTML document in an inline frame (iframe) of the HTML document.

16. The computer implemented method of claim 14, wherein the document viewer is a web browser.

17. A computerized system comprising:
a first content handler that is part of an embedded document embedded in a containing document and that receives untrusted content forwarded by a second content handler that is part of the containing document without rendering the untrusted content in the containing document, wherein the containing document is a first web page displayed in a document viewer, and the embedded document is a second web page having content rendered in the displayed first web page; and
a content processor of the embedded document that receives the untrusted content from the first content handler and renders the received untrusted content in the embedded document;

wherein the document viewer enforces a sandbox policy of the document viewer on the embedded document such that the rendered untrusted content is restricted from accessing at least some data associated with the containing document; and wherein the first content handler and the content processor are executed code of the first web page and the second content handler is executed code of the second web page.

18. The computerized system of claim 17, further comprising a second content handler of the containing document receiving additional untrusted content from the first content handler of the embedded document and the second content handler forwarding the received additional untrusted content to a server.

19. The computerized system of claim 17, further comprising the content processor extracting the untrusted content from a message comprising a string, the string corresponding to the untrusted content.

20. The computerized system of claim 17, further comprising a second content handler that is part of the containing document and that receives the untrusted content from a server, wherein the second content handler forwards the received additional untrusted content to the embedded document for the receiving of the untrusted content by the embedded document.

* * * * *